United States Patent
Yatabe et al.

(12)

(10) Patent No.: US 9,094,712 B2
(45) Date of Patent: Jul. 28, 2015

(54) VIDEO PROCESSING DEVICE, DISPLAY DEVICE AND VIDEO PROCESSING METHOD

(75) Inventors: Yusuke Yatabe, Yokohama (JP); Nobuaki Kabuto, Kunitachi (JP); Hironori Komi, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 7 days.

(21) Appl. No.: 13/161,727

(22) Filed: Jun. 16, 2011

(65) Prior Publication Data
US 2012/0062792 A1    Mar. 15, 2012

(30) Foreign Application Priority Data
Sep. 15, 2010   (JP) .................. 2010-206236

(51) Int. Cl.
| | |
|---|---|
| H04N 21/4363 | (2011.01) |
| H04N 5/775 | (2006.01) |
| H04N 21/41 | (2011.01) |
| H04N 21/432 | (2011.01) |
| H04N 21/436 | (2011.01) |
| H04N 5/14 | (2006.01) |
| H04N 7/08 | (2006.01) |

(52) U.S. Cl.
CPC ........ *H04N 21/43635* (2013.01); *H04N 5/775* (2013.01); *H04N 21/4122* (2013.01); *H04N 21/4325* (2013.01); *H04N 21/43622* (2013.01); *H04N 21/43637* (2013.01); *G09G 2340/02* (2013.01); *G09G 2370/04* (2013.01); *G09G 2370/047* (2013.01); *G09G 2370/12* (2013.01); *H04N 5/14* (2013.01); *H04N 7/08* (2013.01)

(58) Field of Classification Search
USPC .......................................... 348/474
See application file for complete search history.

(56) References Cited

U.S. PATENT DOCUMENTS

| | | | | |
|---|---|---|---|---|
| 2008/0123735 | A1* | 5/2008 | Kobayashi | 375/240.01 |
| 2009/0046993 | A1 | 2/2009 | Nishio | |
| 2009/0153737 | A1* | 6/2009 | Glen | 348/571 |

FOREIGN PATENT DOCUMENTS

| | | |
|---|---|---|
| JP | 6-291859 | 10/1994 |
| JP | 7-131654 | 5/1995 |
| WO | WO2007/102413 | 9/2007 |

OTHER PUBLICATIONS

Office Action in Japanese Patent Application Serial No. 2010-206236, mailed Dec. 17, 2013, 2 pages, in Japanese; [partial English language translation].

* cited by examiner

*Primary Examiner* — Michael Teitelbaum
(74) *Attorney, Agent, or Firm* — Baker Botts L.L.P.

(57) ABSTRACT

The present invention provides a method of notifying a reception side of a fact that a halftone process has been performed for data to be transmitted and a method of transmitting additional information to a reception side in image transferring among a plurality of devices. The present invention includes a step of performing image processes for video information and a step of outputting a signal containing the video information for which the image processes have been performed, and the signal to be output includes information related to the image processes.

6 Claims, 12 Drawing Sheets

| UPPER BIT | LOWER BIT | NAME | DEFINITION |
|---|---|---|---|
| 1 | 0 | SUPER-RESOLUTION EXECUTION FLAG | 0: NON-EXECUTION<br>1: EXECUTION (LOW LEVEL)<br>2: EXECUTION (MIDDLE LEVEL)<br>3: EXECUTION (HIGH LEVEL) |
| 3 | 2 | DIGITAL COMPRESSION NOISE REDUCTION FLAG (MOSQUITO NOISE) | 0: NON-EXECUTION<br>1: EXECUTION (LOW LEVEL)<br>2: EXECUTION (MIDDLE LEVEL)<br>3: EXECUTION (HIGH LEVEL) |
| 5 | 4 | DIGITAL COMPRESSION NOISE REDUCTION FLAG (BLOCK NOISE) | 0: NON-EXECUTION<br>1: EXECUTION (LOW LEVEL)<br>2: EXECUTION (MIDDLE LEVEL)<br>3: EXECUTION (HIGH LEVEL) |
| 7 | 6 | IMAGE NOISE REDUCTION FLAG (RANDOM NOISE) | 0: NON-EXECUTION<br>1: EXECUTION (LOW LEVEL)<br>2: EXECUTION (MIDDLE LEVEL)<br>3: EXECUTION (HIGH LEVEL) |
| 9 | 8 | CONTRAST CORRECTION EXECUTION FLAG | 0: NON-EXECUTION<br>1: EXECUTION (LOW LEVEL)<br>2: EXECUTION (MIDDLE LEVEL)<br>3: EXECUTION (HIGH LEVEL) |
| 11 | 10 | FRAME RATE CONVERSION EXECUTION FLAG | 0: NON-EXECUTION<br>1: EXECUTION (LOW LEVEL)<br>2: EXECUTION (MIDDLE LEVEL)<br>3: EXECUTION (HIGH LEVEL) |
| 13 | 12 | DIGITAL IMAGE COMPRESSION EXECUTION FLAG | 0: NON-EXECUTION<br>1: EXECUTION (LOW LEVEL)<br>2: EXECUTION (MIDDLE LEVEL)<br>3: EXECUTION (HIGH LEVEL) |
| 15 | 14 | 2D → 3D CONVERSION FLAG | 0: NON-EXECUTION<br>1: EXECUTION (LOW LEVEL)<br>2: EXECUTION (MIDDLE LEVEL)<br>3: EXECUTION (HIGH LEVEL) |

| Byte | 7 | 6 | 5 | 4 | 3 | 2 | 1 | 0 |
|---|---|---|---|---|---|---|---|---|
| 0 | Vender Specific Tag Code | | | | Length | | | |
| 1 | | | | | | | | |
| 2 | | | | | | | | |
| 3 | 24 bit IEEE Registration Identifier | | | | | | | |
| 4 | A | | | | B | | | |
| 5 | C | | | | D | | | |
| 6 | Supports AI | DC_48bit | DC_38bit | DC_30bit | DC_Y444 | VIE | Rsvd(0) | DVI_Dual |
| ..... | | | | | | | | |
| | If(3D_Multi_Present==10) | | | | | | | |
| | 3D_MASK 15_8 | | | | | | | |
| | 3D_MASK 7_0 | | | | | | | |
| | 2D_VIC_Order_1 | | | | 2D_VIC_Order_0 | | | |
| | If(VIE==1) | | | | | | | |
| | Video Image Enhancement Flags (lower 8 bit) | | | | | | | |
| | Video Image Enhancement Flags (upper 8 bit) | | | | | | | |

VIDEO PROCESSING DEVICE, DISPLAY DEVICE AND VIDEO PROCESSING METHOD

INCORPORATION BY REFERENCE

This application relates to and claims priority from Japanese Patent Application No. 2010-206236 filed on Sep. 15, 2010, the entire disclosure of which is incorporated herein by reference.

BACKGROUND OF THE INVENTION (1) Field of the Invention

The technical field of the present invention relates to transmission of video signals.

(2) Description of the Related Art

Japanese Patent Application Laid-Open No. H7 (1995)-131654 discloses "in a transmission device which performs a halftone process for image data for transmission, a notifying unit is provided to notify a reception side of that the halftone process has been performed for the transmitted image data when transmitting the image data" in order to achieve an object "to provide a transmission device and a reception device which are capable of preventing the image data for which the halftone process has been performed from being further smoothed and preventing the quality of a printed image from deteriorating".

Further, Japanese Patent Application Laid-Open No. H6 (1994)-291859 discloses "video/audio information includes content information having content itself of each medium and additional information related to the content information; a transmission side transmits a series of pieces of video/audio information and additional information to a specified or non-specified reception side; the reception side preliminarily sets filter conditions under which information flowing in a communication channel is selected and received, and processing conditions of an accumulating, processing, or displaying process method for the received information; a filtering process is performed for the series of pieces of video/audio information transmitted from the transmission side by checking the additional information under the preliminarily-set processing conditions, and the content information to be accumulated is selected; the additional information of the received video/audio information is further checked; the content information of the received video/audio information is accumulated, processed, or displayed by the processing method determined by the preliminarily-set processing conditions; and the accumulated information is interactively read, processed, or displayed under the control of a user" in order to achieve an object "to provide a video/audio information communication method that enables to promptly access and read already-recorded partial information while receiving the information".

SUMMARY OF THE INVENTION

However, Japanese Patent Application Laid-Open No. H7 (1995)-131654 and Japanese Patent Application Laid-Open No. H6 (1994)-291859 consider neither how the fact that the halftone process has been performed for the data to be transmitted is notified to the reception side, nor how the additional information is to be transmitted to the reception side.

In order to solve the above-described problem, for example, a configuration described in the scope of claims of the present invention is employed.

The present application includes a plurality of aspects for solving the problem. As an example, an aspect of the present invention includes a step of performing image processes for video information and a step of outputting a signal containing the video information for which the image processes have been performed, and the signal to be output contains information related to the image processes.

According to the aspect of the present invention, a display device enables to present videos with a higher image quality to users, and user-friendliness is improved.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Hereinafter, embodiments will be described. In the following embodiments, 3D means three dimensions and 2D means two dimensions. For example, a 3D video means a video which allows a viewer to three-dimensionally perceive an object as if the object exists in the same space where the viewer is located by presenting a video with parallax to the right and left eyes of the viewer. Further, for example, a 3D display device is a display device capable of displaying the 3D video. Furthermore, for example, 3D content is content containing a video signal which is processed by the 3D display device to allow the 3D video to be displayed.

[First Embodiment]

Figure 1:
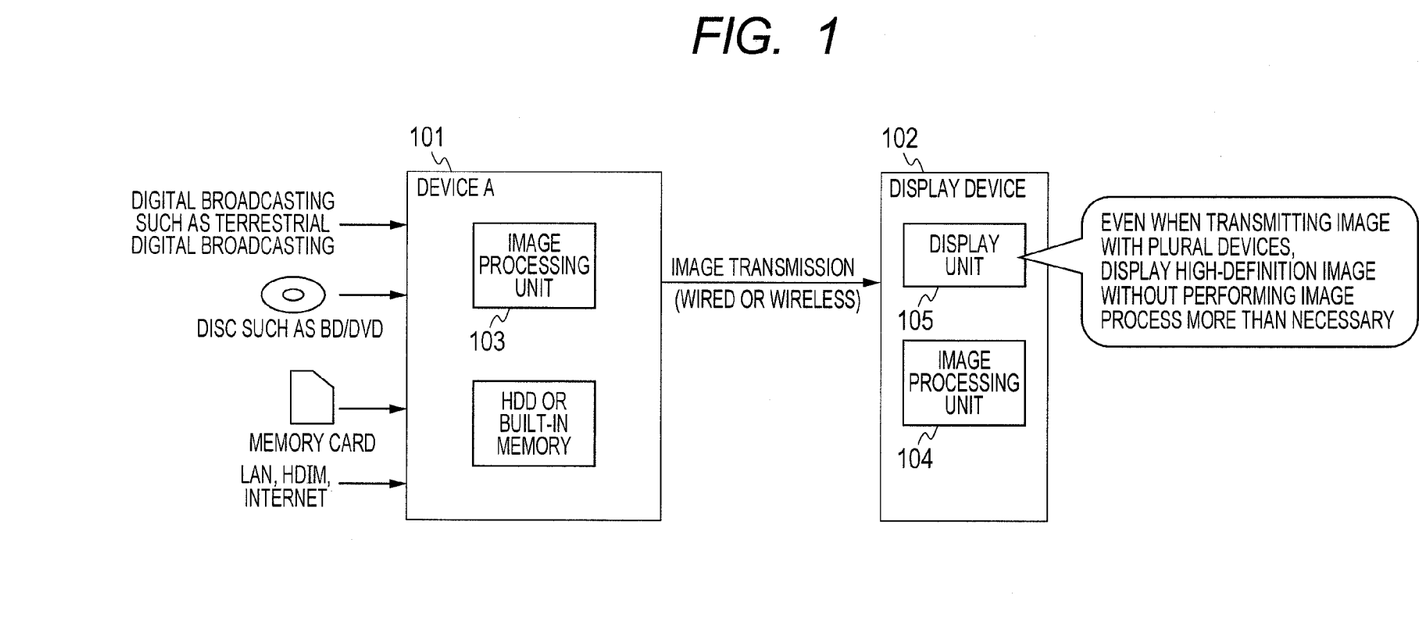
FIG. 1 is a diagram for showing an example of an outline of an embodiment.

The concept of the embodiment is shown in FIG. 1. The embodiment provides units which do not perform high-definition image processes more than necessary when an image is transmitted over a plurality of devices to be displayed. In FIG. 1, image processing units (103 and 104) are redundantly provided at a device A101 and a display device 102, respectively, in the case of transferring an image from the device A101 to be displayed on a display unit 105 of the display device 102. However, there is a possibility that redundant image processes cause deterioration in image quality. Thus, the image processes are performed by one of the image processing units, or by the both image processing units with an appropriate allocation to realize a high-definition image.

Figure 2:
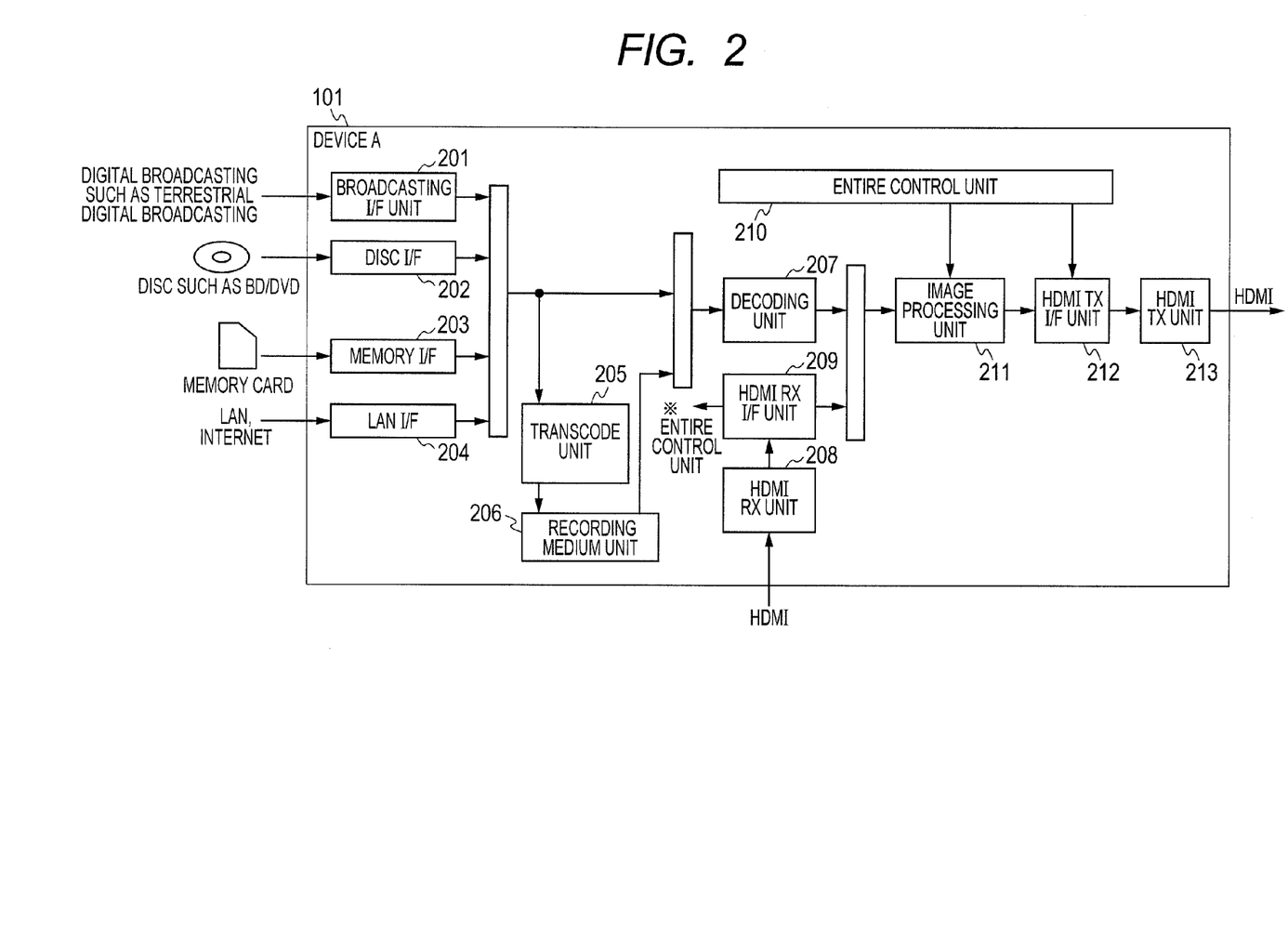
FIG. 2 is a diagram for showing an example of a configuration of a device A in the embodiment.

FIG. 2 shows a block diagram of the device A. The device A includes a broadcasting I/F 201 which receives and demodulates digital broadcasting signal such as terrestrial digital broadcasting signal, a disc I/F unit 202 which reads data from a disc recording medium such as a DVD (an abbreviation of "Digital Versatile Disc") or a BD (an abbreviation of "Blu-ray (registered trademark) Disc"), a memory I/F unit 203 which reads data from a memory such as an SD card, a LAN I/F 204 which reads data from the Internet or a LAN, a transcode unit 205 which transcodes an input AV stream to be stored into a recording medium unit 206 (which may be a drive for recording data into a removable recording medium) such as an HDD, a decoding unit 207 which extends compressed video information contained in the AV stream, an HDMI RX unit 208 which receives an image transmitted through an HDMI (an abbreviation of "High Definition Multimedia Interface" (registered trademark)), an HDMI RX I/F unit 209 which analyzes the transmitted data, an image processing unit 211 which performs a high-definition process with an instruction from an entire control unit 210, an HDMI TX I/F unit 212 which creates data compliant with an image transmission standard such as the HDMI on the basis of the image received from the image processing unit and control information from the entire control unit, and an HDMI TX unit 213 which actually transmits data.

Figure 3:
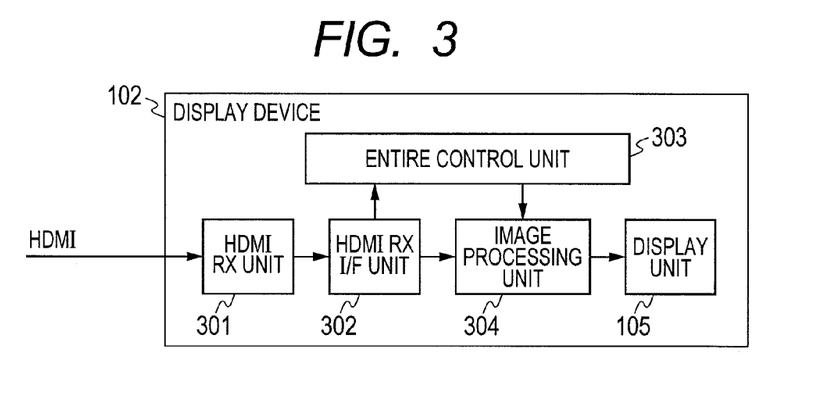
FIG. 3 is a diagram for showing an example of a configuration of a display device in the embodiment.

FIG. 3 shows a block diagram of the display device. The display device includes an HDMI RX unit 301 which receives information transferred through image transmission such as the HDMI, an HDMI RX I/F unit 302 which reads internal data to be notified to the entire control unit 303, an image processing unit 304 which performs a high-definition image process with an instruction from the entire control unit, and a display unit 105 which displays the image.

Figure 4:
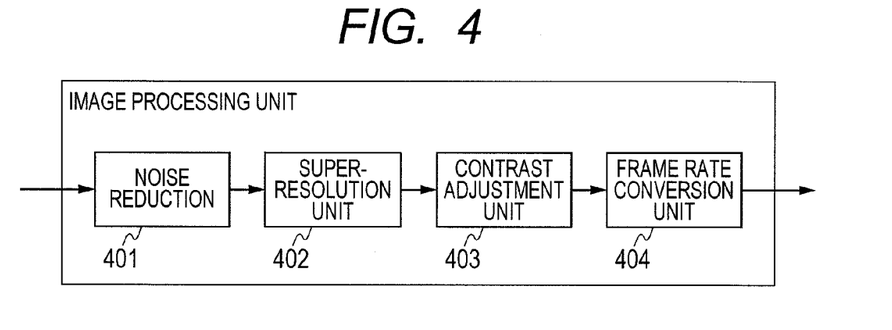
FIG. 4 is a diagram for showing an example of an image processing unit in the embodiment.

FIG. 4 shows an example of the image processing unit 211 or 304. For the high-definition image process, there are provided a noise reduction unit 401 which eliminates mosquito noise or block noise generated due to image compression, or noise such as random noise randomly generated when taking an image, a super-resolution unit 402 which emphasizes edge components and improves the resolution, a contrast adjustment unit 403 which corrects the contrast of an image, and a frame rate conversion unit 404 which improves the frame rate of a video.

It is only necessary to provide appropriate ones among these processes depending on the functions of the device or value settings, and all the functions do not need to be provided. In addition, a process of converting a 2D video to a 3D video by signal processing is arranged before or after the frame rate conversion unit, so that a 3D signal can be generated.

If these image processes are redundantly performed by a plurality of devices more than necessary, the image quality is deteriorated. In order to solve these problems, information on whether or not the image processes have been performed is added to information of AVI InfoFrame (an abbreviation of Auxiliary Video information InfoFrame" and an area where information on a video to be transmitted is described) defined in the HDMI standard, and the processes having not been done are performed by each device on the basis of the information. Accordingly, it is possible to prevent the image processes from being performed more than necessary to suppress the deterioration of the image quality. This method will be described in detail.

Figure 5:
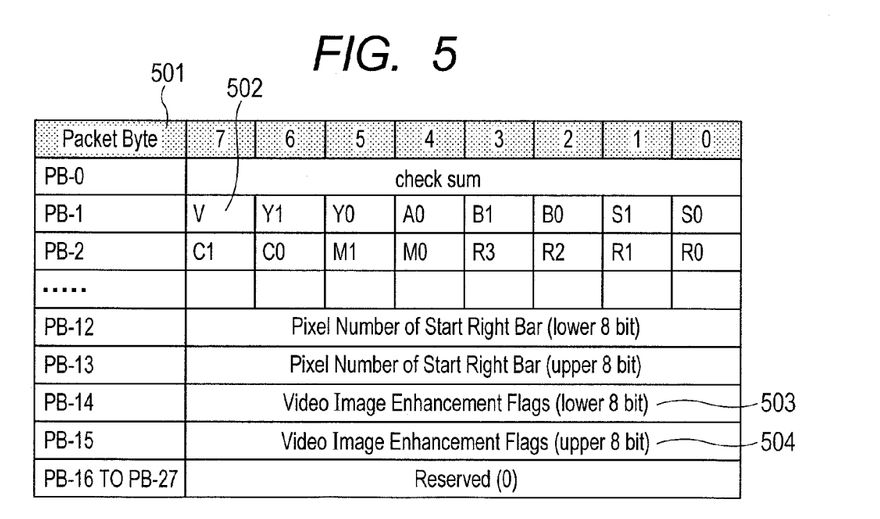
FIG. 5 is a diagram for showing an example of information used in the embodiment.

FIG. 5 shows an example (501) of bit definitions in which areas for adding flags indicating execution of the image processes are added to bit definitions of "AVI InfoFrame" defined in the HDMI standard. "Video Image Enhancement Flags (lower 8 bit)" is defined in PB14 (503). "Video Image Enhancement Flags (upper 8 bit)" is defined in PB15 (504). These definitions will be described later.

In addition, a flag indicating whether the bits are available is defined as V at the 7th bit of PB1 (502). If the bit is "1", the flags of PB14 and PB15 are available. For a conventional device that is not adapted to the flags, "0" is described at the 7th bit of PB1 (502) as a reserved area, and thus it is determined that these flags are not available. Thus, this description method is excellent in backward compatibility.

Figure 6:
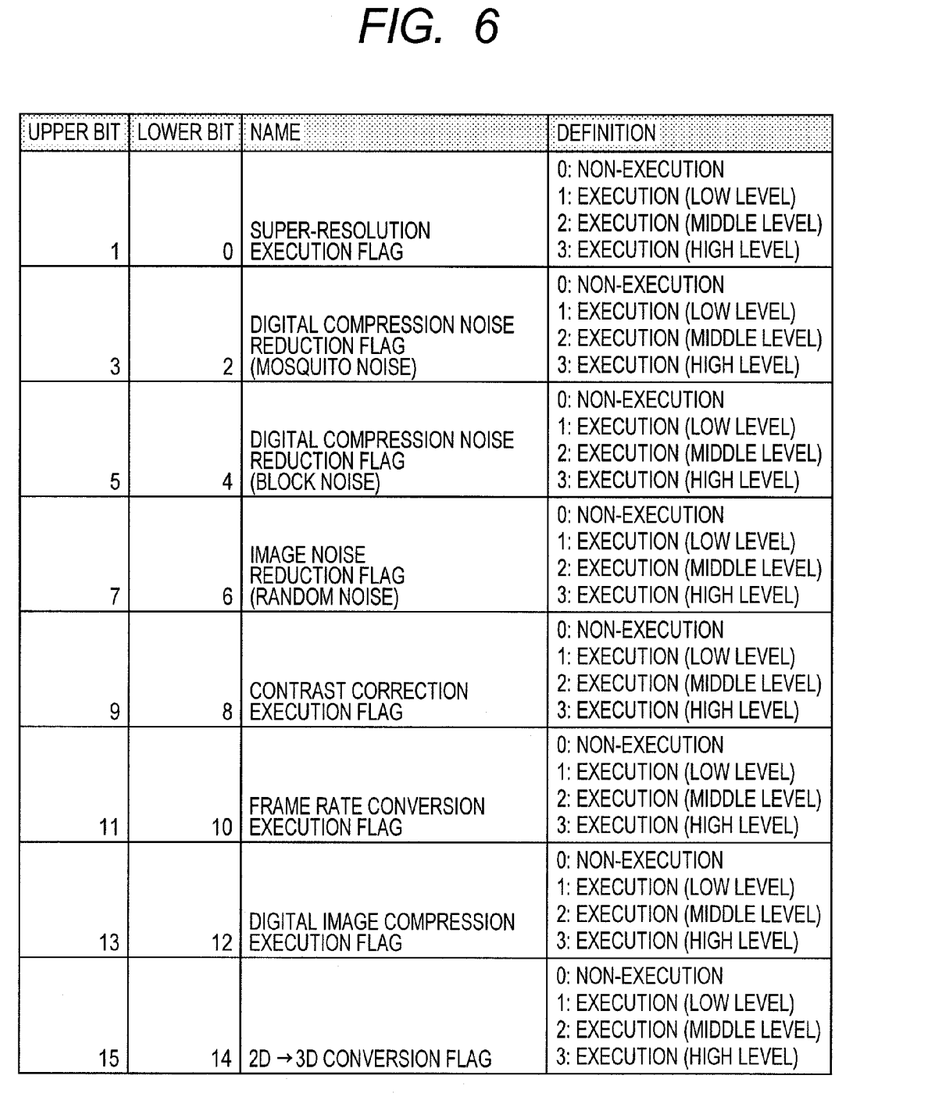
FIG. 6 is a diagram for showing an example of definitions of the information used in the embodiment.

FIG. 6 shows an example of definitions of "Video Image Enhancement Flags (VIE)" defined in PB14 and PB15. 2-bit areas are provided for each process, so that the presence of absence of the execution of the process and the level of the process can be set.

A super-resolution execution flag is a flag indicating whether or not a super-resolution process has been executed and the level of the execution. At this time, the super-resolution process is categorized into one. However, the super-resolution processes include one-frame super-resolution which creates only with information of the frame, and plural-frames super-resolution which improves the resolution using a few adjacent frames. The presence or absence of the execution and the level of the process may be defined for each super-resolution processing method. The categorization for each process is similarly applied to the processes defined at sections with different names.

A digital compression noise reduction flag is a flag indicating whether or not block noise and mosquito noise generated in image compression has been eliminated and the level of the execution. The reduction methods include a method for eliminating the noise by filtering, a method in which the original image before image compression is estimated for interpolation, a method for executing the noise reduction on one target screen, and a method for executing the noise reduction using a plurality of frames. The digital compression noise reduction flag may be categorized for each method.

An image noise reduction flag is a flag indicating whether or not random noise generated when taking an image has been eliminated and the level of the execution. The image noise reduction processes include a method for processing in one screen and a method for eliminating the noise using a plurality of screens. However, the image noise reduction flag may be categorized for each method.

A contrast adjustment execution flag is a flag indicating whether or not the visual quality of the image such as the contrast of the image, color management, and adjustment of γ has been adjusted and the level of the execution. The contrast adjustment flag may be categorized for each process.

A frame rate conversion flag is a flag indicating whether or not frame rate conversion has been performed and the level of the execution. The frame rate conversion flag may be categorized for each frame rate conversion method. Further, the number of interpolated frames to improve the frame rate may be described in the level information.

A digital image compression execution flag is a flag indicating whether or not image compression/extension such as transcode has been performed by a device at the time of transferring the image among devices, and the level of the execution. The digital image compression execution flag is stipulated because, for example, if transcode or the like is performed in image transferring, reduction of the image compression noise and the super-resolution process need to be applied again. The digital image compression execution flag may be categorized depending on the type of transcode.

A 2D-3D conversion flag is a flag indicating whether or not a 2D video signal has been converted to a 3D video signal by signal processing, and the level of the execution. For example, the flag is used to prevent multi-conversion by a plurality of devices.

Further, as image information necessary for these image processes, for example, frame information such as the compression standard, bit rate, quantization value (the average value or the maximum or minimum value of GOP, frames, and the number of divided frames), movement information, and I/P/B-picture of an image being transferred; the size and frame rate of an image at the time of compression; the magnifying percentage of an output image; content information (a source such as terrestrial digital broadcasting or a BD, and detailed program content); and information on whether or not OSD is added is added, so that the information can be used as useful information when the image processes are performed in the subsequent devices. Accordingly, these pieces of information may be added to VIE.

Next, a detecting method and an adding method of the AVI InfoFrame information will be described. When an image is transmitted from a device that received a video stream from outside using the HDMI, "AVI InfoFrame" is added by the HDMI TX I/F unit, and the device that received the image allows the HDMI RX I/F unit to read "AVI InfoFrame" to be notified to the entire control unit. The entire control unit selects necessary image processes to be notified to the image processing unit where the image processes are performed. In the case where the image obtained after the image processes is further transferred to another device using the HDMI, the HDMI TX I/F unit creates and transfers the information of "AVI InfoFrame" through the HDMI while activating the flag whose image processes have been performed. Accordingly, excessive image processes can be prevented from being executed among connected devices and a high-definition image can be realized.

In order to turn on or off each image process, a user may select ON or OFF, and High or Low of the functions in each device. In this case, if a redundant image process is to be performed by a connected device, the user may be notified of the execution of the image process function and change of the level using tickers, and the execution of the image process may be changed if OK is selected by the user.

It should be noted that although the example of using "AVI InfoFrame" has been described in the embodiment, the embodiment is not limited to this. Information related to the image processes may be transmitted using different InfoFrame information and additional information. For example, the information may be defined at areas subsequent to PB6 of "HDMI Vendor Specific InfoFrame".

[Second Embodiment]

In the first embodiment, the presence or absence of the image processes is notified using the area of "AVI InfoFrame" of HDMI. An example of transferring the same flags using EDID (Extended Display Identification Data) compliant with the VESA standard containing information such as display basic information and the maximum resolution will be described in the embodiment. It should be noted that one or both of the function using "AVI InfoFrame" and the function using EDID may be provided. If a device is adapted to the both functions, the redundant image processes of the embodiment can be advantageously avoided even if the device at the other end is adapted to only one of the functions.

Figure 7:
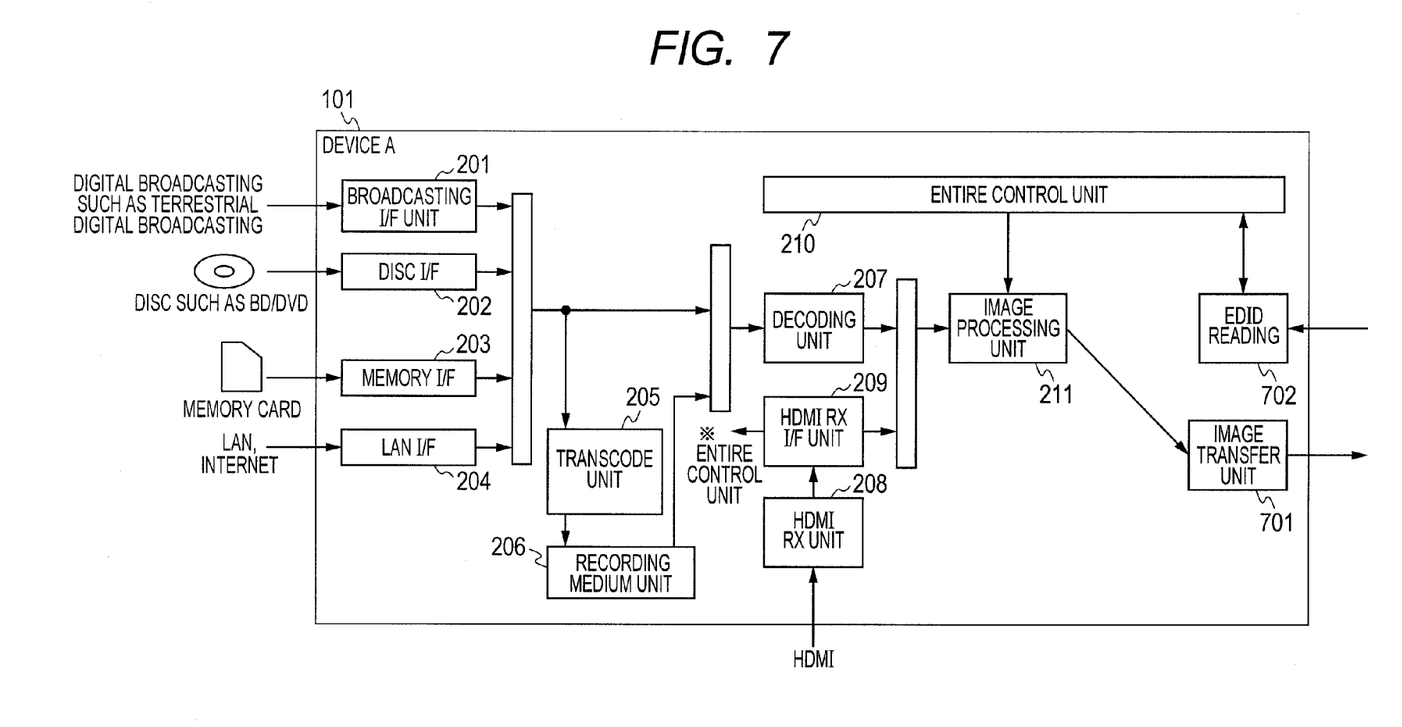
FIG. 7 is a diagram for showing an example of a configuration of the device A in the embodiment.

FIG. 7 shows an example of a configuration of a device A using the EDID. In FIG. 1, the image is transmitted from the device A to the display device using the HDMI. However, another image transmission method such as DVI may be used instead of the HDMI. FIG. 7 is different from the configuration shown in FIG. 2 in that there are provided an image transfer unit 701 from which an image is output and an EDID reading unit 702 which reads the EDID from the display device and transmits a signal to the control unit.

Figure 8:
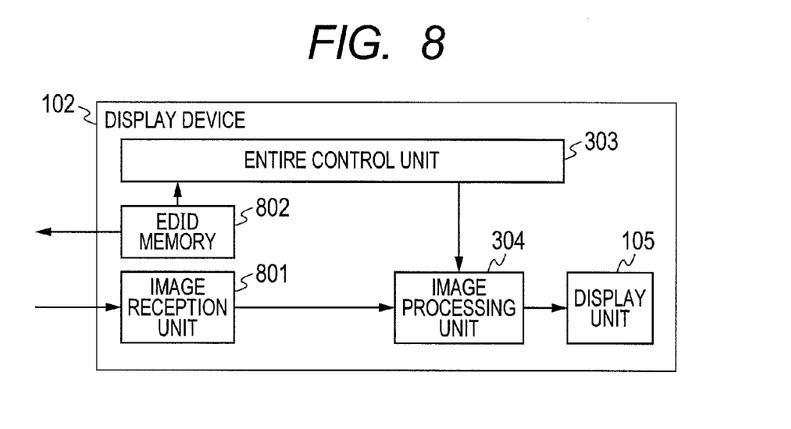
FIG. 8 is a diagram for showing an example of a configuration of the display device in the embodiment.

FIG. 8 shows an example of a configuration of a display device using the EDID. The configuration of FIG. 8 is different from that of FIG. 3 in that there are provided an image reception unit 801 which receives an image, and an EDID memory 802 which stores an EDID signal with display information and the presence or absence of image processes added and transfers the signal to the EDID reading unit.

Figure 9:
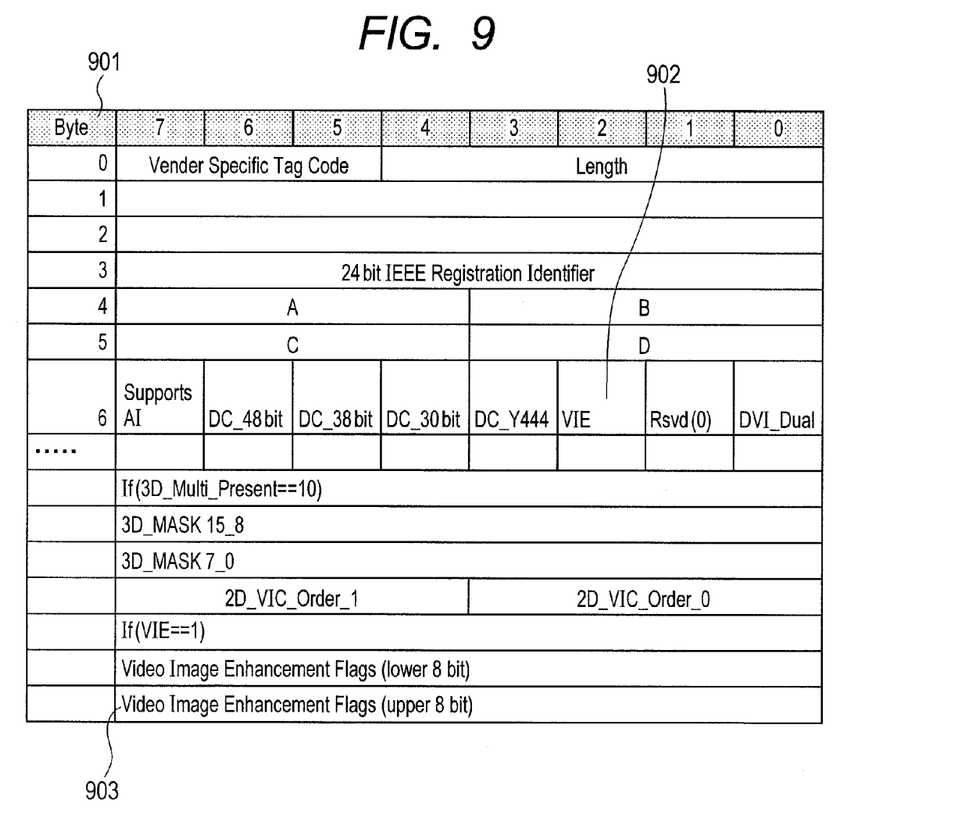
FIG. 9 is a diagram for showing an example of information used in the embodiment.

FIG. 9 shows bit definitions 901 in which the application flags for the image processes of FIG. 6 are added to bit definitions of the EDID information. A flag "VIE" 902 indicating whether or not "Video Image Enhancement Flags" is present is added to the second bit of Byte 6. If the flag is 1, it means that "Video Image Enhancement Flags" is present in the section subsequent to the bit definition. Then, "Video Image Enhancement Flags" 903 is defined at the section subsequent to the definition. It should be noted that the definition of the VIE may be similar to the first embodiment.

On the basis of the information, for example, the device A reads the EDID of the display device, the content of the image processes to be performed by the display device is confirmed on the basis of the read EDID, and the image processes to be performed by the display device are not performed by the device A. Further, for example, if the execution level at the display device is low or middle, the user may select whether or not the image processes are to be performed by the device A.

Accordingly, excessive image processes can be prevented from being executed between connected devices using the mechanism of the EDID, and a high-definition image can be realized. Especially, in an existing system where information of the EDID is transmitted and received, a high-definition image can be realized without transmission and reception of new information.

It should be noted that although the processes using the VIE of the EDID have been described in the embodiment, the embodiment is not limited to this. Information related to the image processes may be transmitted using other areas of the EDID and other information such as the capability of the display device.

[Third Embodiment]

An example of a method in which information is transmitted and received using information of CEC (Consumer Electronics Control) that is a bidirectional communication control function provided to the HDMI will be described in the embodiment.

Figure 11:
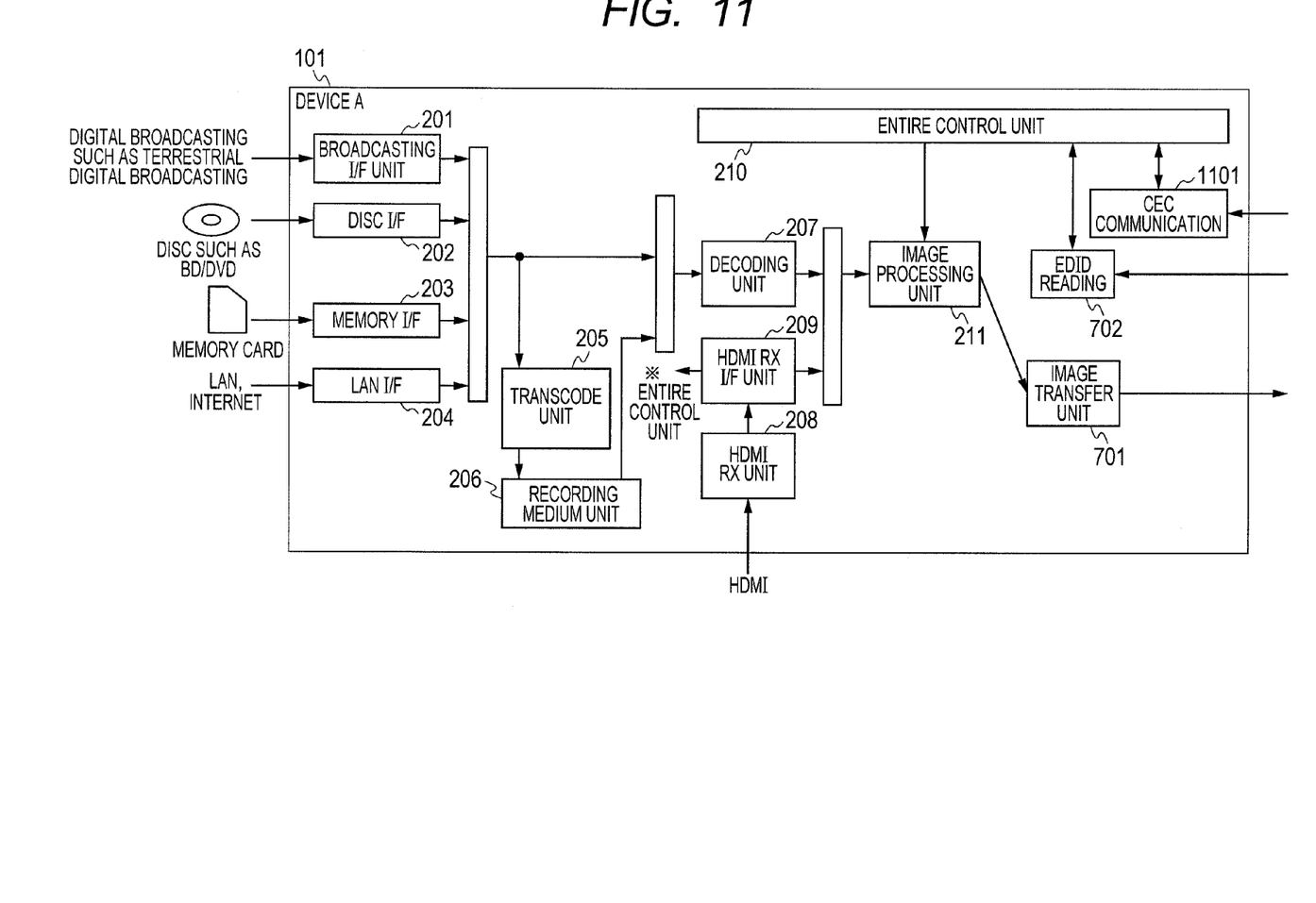
FIG. 11 is a diagram for showing an example of a configuration of the device A in the embodiment.

FIG. 11 is a diagram for showing an example of a configuration of a device A with a CEC communication mechanism added. A CEC communication unit 1101 which communicates with another device connected through the HDMI is added.

Figure 12:
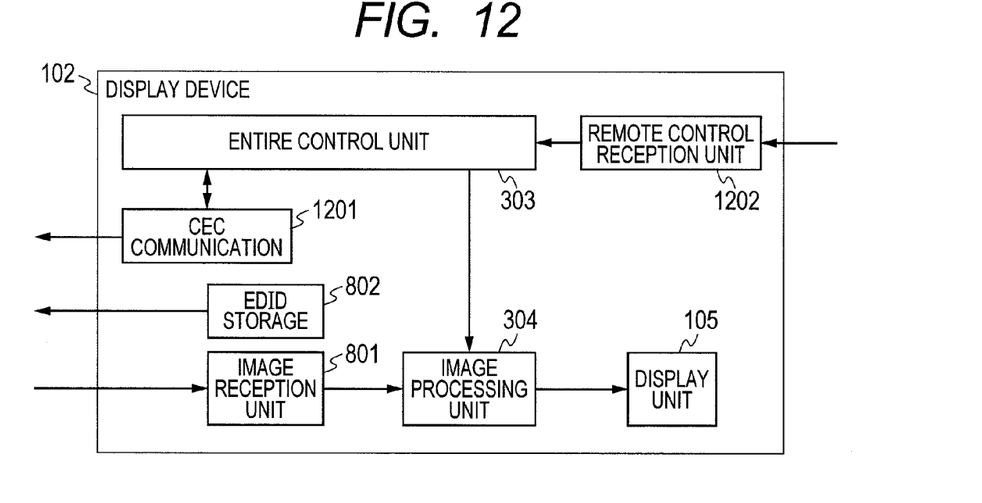
FIG. 12 is a diagram for showing an example of a configuration of the display device in the embodiment.

FIG. 12 is a diagram for showing an example of a configuration of a display device with a CEC communication mechanism added. A CEC communication unit 1201 which communicates with another device connected through the HDMI and a remote control reception unit 1202 which receives remote-controlled operations from a user to be notified to the control unit are added.

Figure 13:
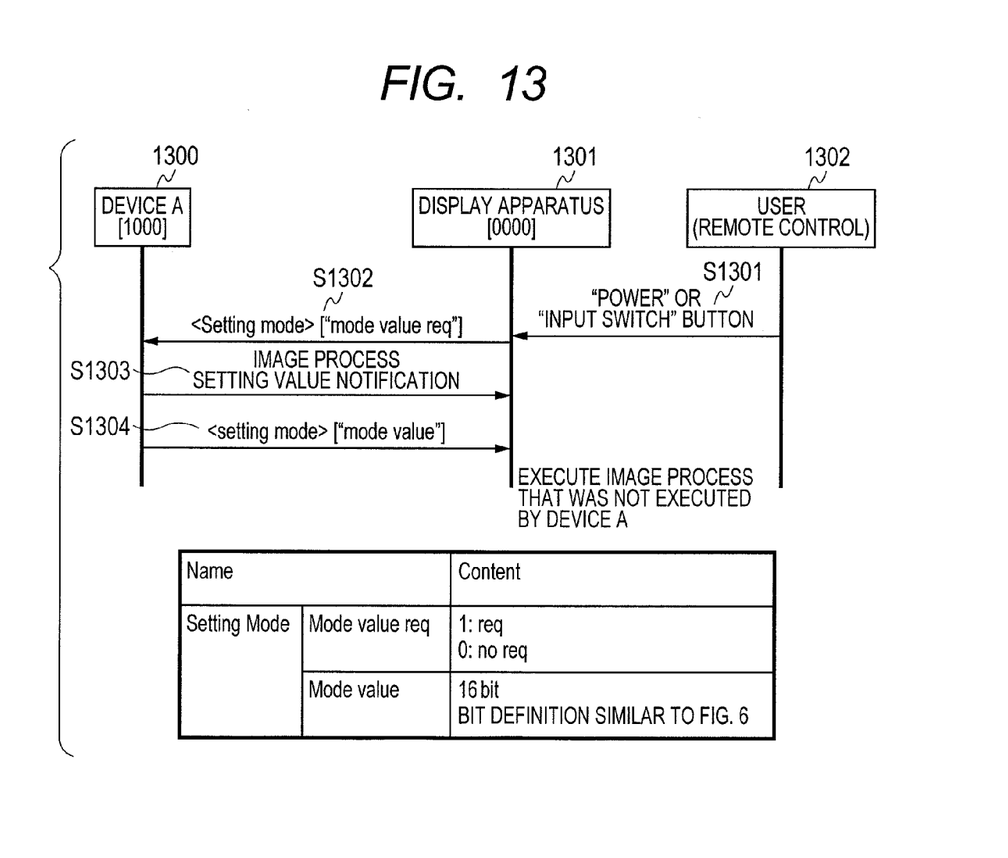
FIG. 13 is a diagram for showing an example of a process in the embodiment.

FIG. 13 is a flowchart for showing an example of CEC communications. A user switches an input to the display device when turning the power on or through a remote control (S1301). In the case where the device A is connected to the display device, a request for notifying of setting values of the image process function is issued to the device A (S1302), the setting values are acquired from the device A (S1303 and S1304), and the image process functions which are not done by the device A are performed by the display device. Further, for example, when the execution level at the device A is low or middle, the user may select whether or not the image processes are to be performed by the display device.

The definition of each request signal is shown at the lower part of FIG. 13. "Mode value req" indicates a transfer request for the image process setting values using one bit, and "Mode value" corresponds to the actual image process function setting values. The detailed bit definition of "Mode value" is similar to FIG. 6.

It is conceivable that the image process setting values is changed by the user operating the device A during reproducing at the device A. In this case, a setting change result may be notified from the device A to change the setting values.

Figure 14:
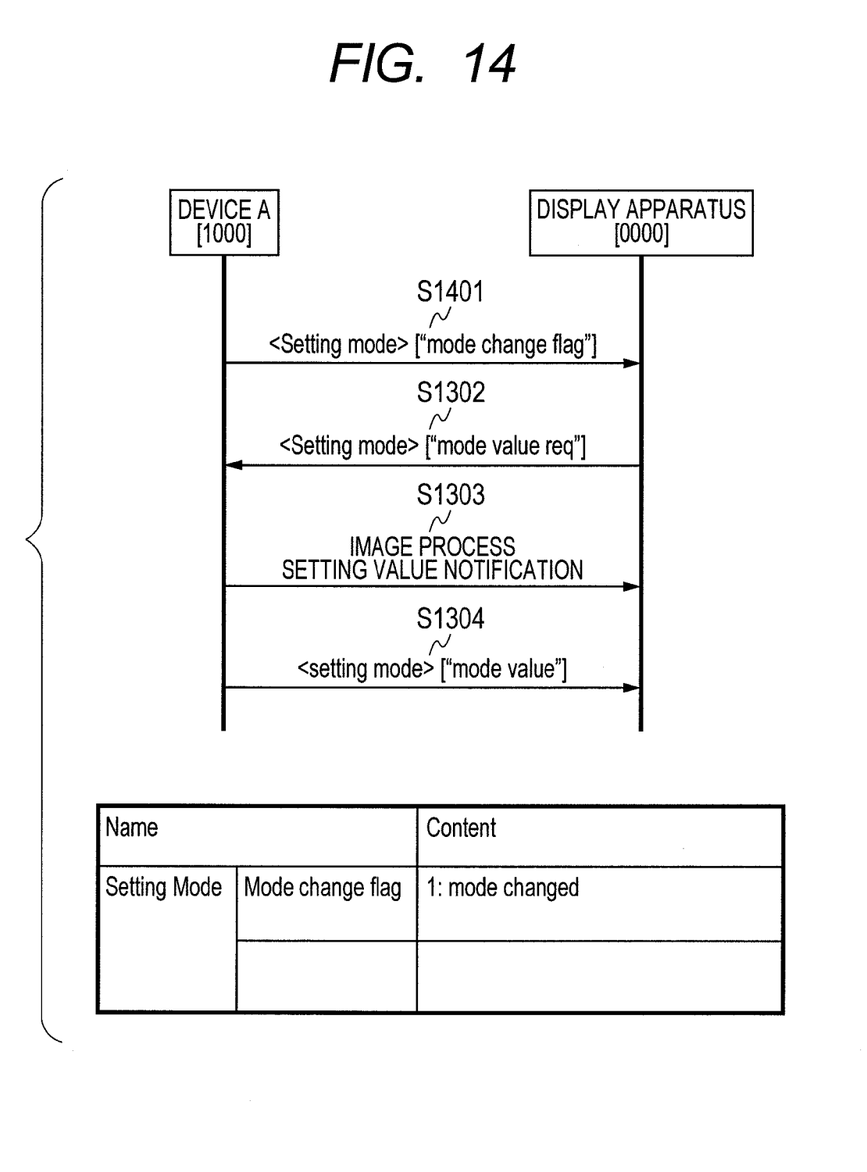
FIG. 14 is a diagram for showing an example of a process in the embodiment.

FIG. 14 shows a flow in such a case. When the display is notified from the device A that the mode has been changed (S1401), a setting value notification request is issued to the device A as similar to the above to acquire the setting values as actual image process function setting values.

Accordingly, excessive image processes can be prevented from being executed among connected devices using the CEC mechanism, and a high-definition image can be realized. Especially, in an existing system where information is transmitted and received using the CEC, a high-definition image can be realized without transmission and reception of new information. It should be noted that the area of "AVI InfoFrame" of the first embodiment and the usage of the EDID of the second embodiment may be combined with the third embodiment using CEC. By using in combination, it is possible to prevent the redundant image process functions while being connected to a device having the function described in any one of the embodiments. Further, in the case where a device is adapted to the all functions, the CEC mechanism of the embodiment in which real-time information can be bi-directionally exchanged may be given a priority for use. By giving a priority to the processes using the CEC, more-reliable operations can be expected.

[Fourth Embodiment]

In the first to third embodiments, the methods of transferring the VIE information have been described. In the embodiment, there will be described a mechanism which allows a user to freely determine the execution of the image processes among a plurality of devices under the environments where the VIE information can be transferred. Recently, most of recorders and TVs are equipped with the image process functions. However, turning on or off the image process functions necessary for each device is an annoying task.

In order to solve this problem, a mechanism capable of selecting the image process functions of a plurality of devices with one device is provided. Accordingly, the user can easily select a desired function, resulting in improvement of user-friendliness and realization of a high-definition image.

Figure 10:
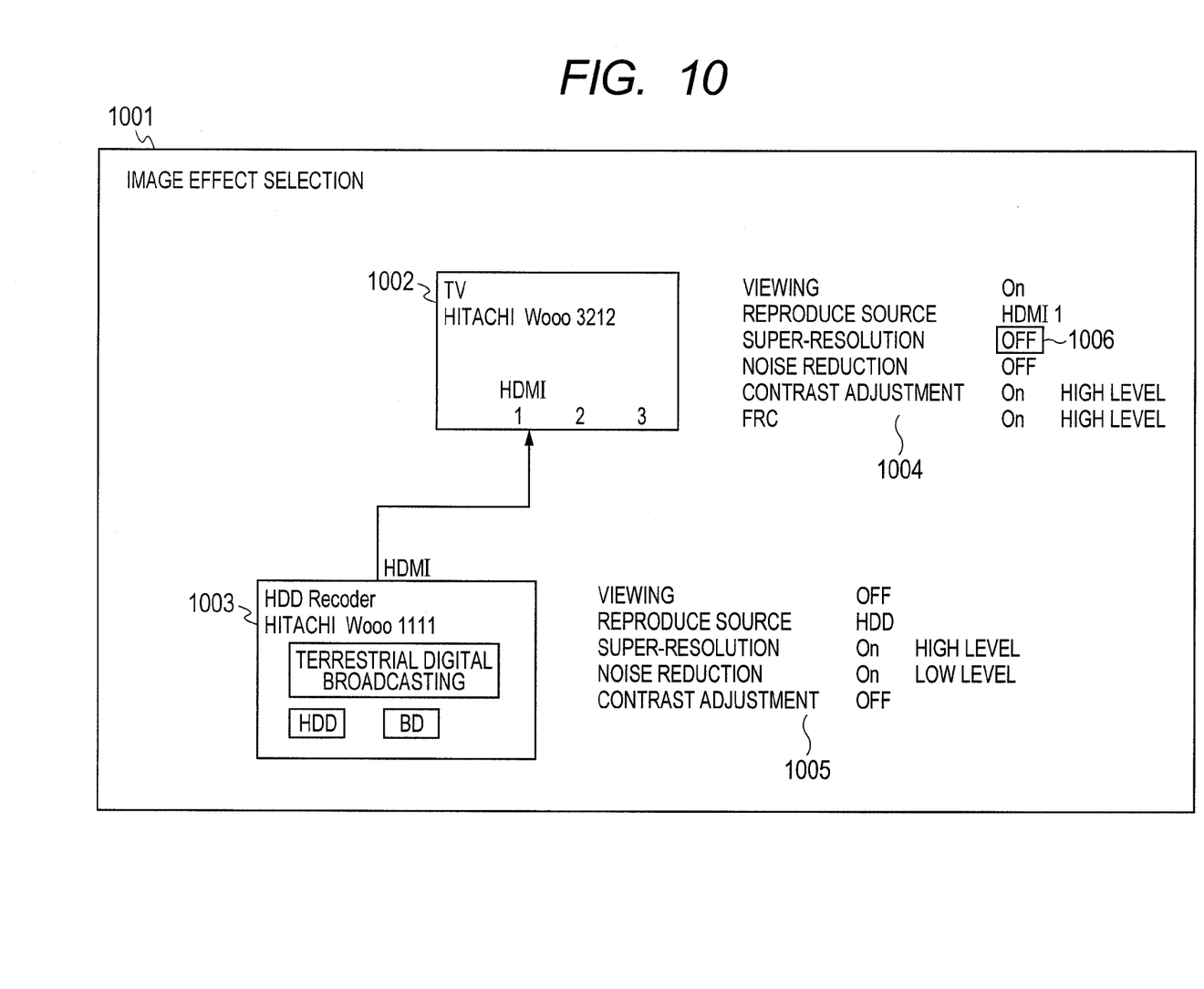
FIG. 10 is a diagram for showing an example of display of the display device in the embodiment.

FIG. 10 shows an example of a display screen of the display device. An image showing a display device 1002 which displays the video and an image showing a connected device 1003 are displayed on a display 1001. At this time, information such as device names, manufactures, and serial numbers may be displayed if they could be acquired.

In addition, the type of I/F through which the both devices are connected is illustrated. Then, the image process functions provided to each device are displayed on the side of each device (1004 and 1005), and ON/OFF and the level information of each function are shown. Further, viewing or not viewing, and the type of medium from which the reproduced source is read may be shown. The user selects ON/OFF and the level of the image processes by moving a cursor 1005 through, for example, a remote control.

Figure 15:
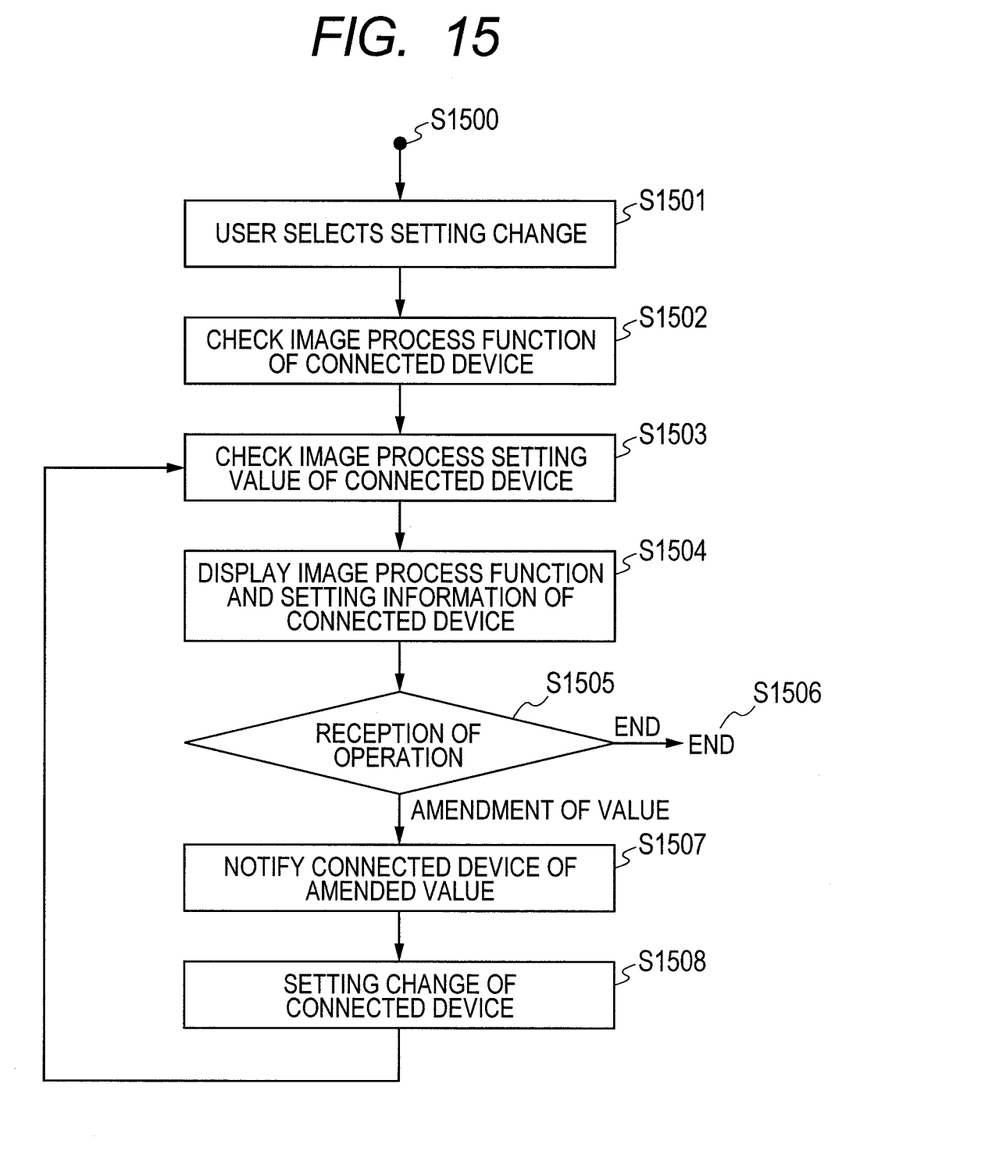
FIG. 15 is a diagram for showing an example of a process in the embodiment.

FIG. 15 shows an example of processes using the CEC communications. When the user presses a button for changing the functions and setting values of the image processes with a remote control, the processes start (1500 and 1501). In the first place, the image process functions provided to each device that is connected to the display device are checked (S1502). Next, the setting values of the image process functions are checked (S1503). Then, the image process functions and setting values are displayed on the display on the basis of the checking result (S1504).

In the case where the user changes the setting values through the remote control (in the case of "amendment of the value" in S1505), the amended value is notified to the device A (S1507), the image process setting values of the device A are changed (S1508), and the setting values of the device A are confirmed and reflected on the screen again. If the user selects an end with the remote control (in the case of "end" in S1505), the processes are completed (S1506).

Figure 16:
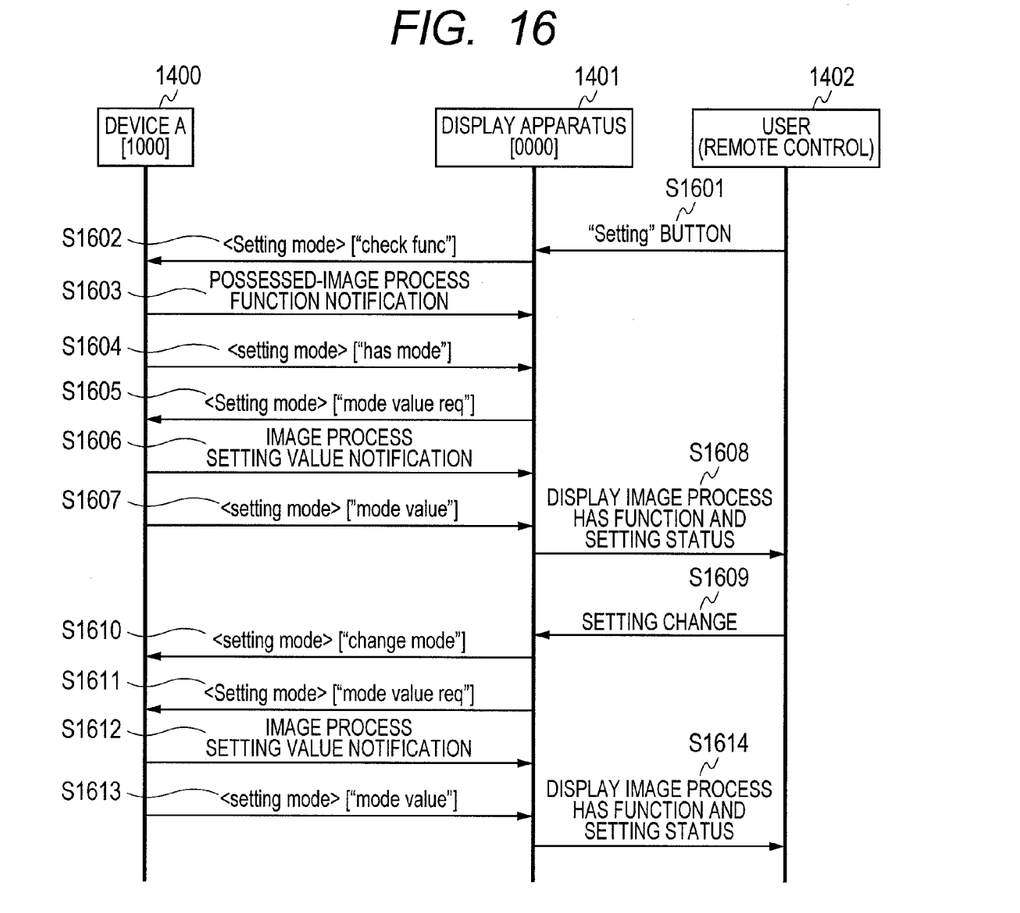
FIG. 16 is a diagram for showing an example of a process in the embodiment.

The processes will be further described using FIG. 16. When the user presses the setting button with the remote control (S1601), the display device checks the image process functions and setting values of a connected device (S1602), and information related to the image process functions and setting values is acquired from the connected device (S1603 and 1604) to be displayed on the screen. In the case where the user changes the values, the changed setting values are notified to the device (S1605), and are acquired from the device (S1606 and S1607). In addition, the values displayed on the screen are changed (S1608).

Thereafter, in the case where the user changes the setting values on the setting screen (S1609), a "change mode" command is issued from the display device to the target device (S1610), and the changed setting values are notified. The settings are changed by the target device. The display device checks the setting values again (S1611) to transfer the checking result to the display device (S1612 and S1613), and image process has functions and a setting status are displayed on the display device (S1614).

It should be noted that in order to change the setting values of the change mode command, an I/F that receives OK/NG for the setting change may be added.

Figure 17:
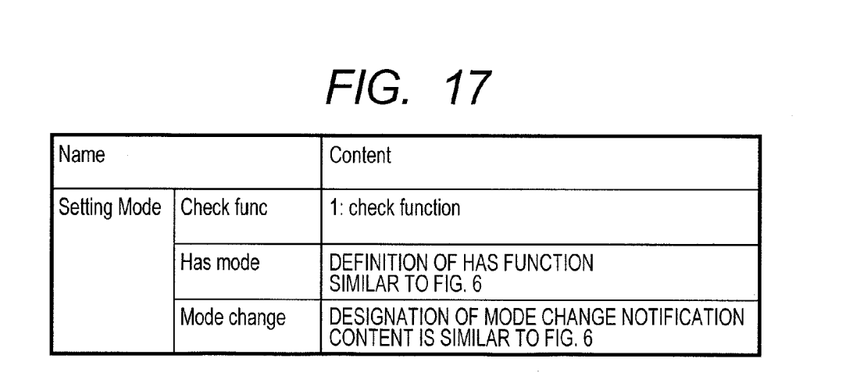
FIG. 17 is a diagram for showing an example of definitions of the information used in the embodiment.

FIG. 17 shows bit definitions of communications between devices necessary for the operation. "Has mode" and "mode change" follow the definitions shown in FIG. 6. In "has mode", for example, a has mode is presented by notifying the possessed functions at an execution level of 3.

Accordingly, the user can easily select a desired function, leading to improvement of user-friendliness and realization of a high-definition image.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A video processing device comprising:
   at least one processor executing instructions to implement:
   an extension unit which extends compressed video information;
   an image processing unit which performs image processes for the video information extended by the extension unit; and
   an interface unit which outputs a signal containing the video information obtained after the image processes are performed by the image processing unit,
      wherein the signal outputted from the interface unit includes information showing whether or not the video information has been subjected to the image processes by the image processing unit,
      wherein, when the interface unit receives, from a display device connected to the interface unit, a message requiring the interface unit to transmit information on functions and setting values of the image processes by the image processing unit, the interface unit is configured to transmit, to the display device, the information on functions and setting values of the image processes by the image processing unit,
      wherein, when the interface unit receives, from the display device, a message requiring the interface unit to modify the setting values of the image processes by the image processing unit, the interface unit is configured to modify the setting values of the image processes by the image processing unit based on the received message, and
   wherein the functions of the image processes to modify the setting values include any one or a plurality of at least 2D-3D conversion, execution of digital image processes, digital compression noise reduction, contrast adjustment execution and frame rate conversion.

2. The video processing device according to claim 1, wherein
   the signal outputted from the interface unit includes an area where information related to the video information contained in the signal is described, and the information showing whether or not the video information has been subjected to the image processes at the image processing unit is described in the area where the information related to the video information is described.

3. A video processing method for a video processing device which outputs video information to a display device connected through an interface to the video processing device, comprising the steps of:
   performing image processes for the video information; and
   outputting from the interface a signal including the video information obtained after the image processes are performed,
   wherein
   the signal to be output from the interface includes information on whether or not the image processes have been performed,
   wherein, when a message from the display device requiring information on functions and setting values of the image processes to be transmitted is received by the interface, the information on functions and setting values of the image processes is transmitted from the interface to the display device,
   wherein, when a message from the display device requiring the setting values of the image processes to be modified is received by the interface, the setting values of the image processes are modified on the basis of the received message, and
   wherein the functions of the image processes to modify the setting values include any one or a plurality of at least 2D-3D conversion, execution of digital image processes, digital compression noise reduction, contrast adjustment execution and frame rate conversion.

4. The video processing method according to claim 3, wherein
   the signal to be output includes an area where information related to the video information contained in the signal is described, and the information showing whether or not the image processes have been performed is described in the area where the information related to the video information is described.

5. A display device comprising:
   at least one processor executing instructions to implement:
   an interface unit which receives uncompressed video information transmitted from a video processing device;
   an image processing unit which performs image processes for the uncompressed video information received by the interface unit; and
   a display unit which displays the video information obtained after the image processes are performed by the image processing unit,
   wherein the interface unit is configured to receive information showing whether or not the video processing device has performed the image processes for the uncompressed video information,
   wherein the image processing unit is configured to perform the image processes for the uncompressed video information on the basis of the information received by the interface unit showing whether or not the video processing device has performed the image processes for the uncompressed video information,
   wherein the interface unit is configured so that a message requiring functions and setting values of the image processes is transmitted from the interface unit to the video processing device, and a setting screen, which allows the setting values of the image processes by the video processing device to be modified on the basis of information received by the interface unit on the functions and setting values of the image processes by the video processing device, is generated so as to be displayed on the display unit,
   wherein the interface unit is further configured so that the setting values of the image processes by the video processing device which have been modified with the setting screen displayed on the display unit in use are transmitted from the interface unit to the video processing device, and
   wherein the functions of the image processes to modify the setting values include any one or a plurality of at least 2D-3D conversion, execution of digital image processes, digital compression noise reduction, contrast adjustment execution and frame rate conversion.

6. The display device according to claim 5, wherein the image processing unit is configured not to perform the image processes when it is shown in the information showing whether or not the video processing device has performed the image processes that the image processes have been performed.

* * * * *